United States

Ray

4,072,900
Feb. 7, 1978

[54] CB RADIO ACCESSORY UNIT

[76] Inventor: Carl L. Ray, 218 Woodland Hills Drive, Biloxi, Miss.

[21] Appl. No.: 799,785

[22] Filed: May 23, 1977

[51] Int. Cl.$^2$ .......................................... H04B 17/00
[52] U.S. Cl. ...................................... 325/67; 325/133; 325/21
[58] Field of Search .................. 325/21, 22, 25, 67, 325/133, 363; 324/58 A–58 B, 115, 140 R; 343/850, 852, 858, 703

[56] References Cited

U.S. PATENT DOCUMENTS

| | | | |
|---|---|---|---|
| 3,464,012 | 8/1969 | Webb | 324/115 |
| 3,665,310 | 5/1972 | Tweed | 325/21 |
| 3,725,942 | 4/1973 | Ukmar | 325/22 |
| 4,037,158 | 7/1977 | Eastmond | 325/22 |
| 4,041,395 | 8/1977 | Hill | 325/67 |

*Primary Examiner*—Robert L. Griffin
*Assistant Examiner*—Jin F. Ng
*Attorney, Agent, or Firm*—William E. Jackson

[57] ABSTRACT

A CB radio accessory unit combining a plurality of selectively switched measuring means, means for switching multiple antennas, and antenna tuning means is disclosed. The accessory unit permits an operator to quickly optimize CB RF system performance in a given setting and to make performance measurements on the RF system.

7 Claims, 2 Drawing Figures

CB RADIO ACCESSORY UNIT

BACKGROUND OF THE INVENTION

The present invention relates to accessory units for use with citizens band (CB) radio transceivers operating in the 27 Mhz frequency band. With the increased interest in CB radio, CB equipment users and operators have become more sophisticated and many demand optimum performance from their equipment. It is well known in the radio art to employ various test and measuring sets such as standing wave ratio (SWR) monitoring circuits for monitoring transission lines, radio frequency (RF) power detection circuits for measuring power, and field strength detection circuits to determine the quality of performance of radio equipment. While the foregoing types of RF measurements can be made with CB radio equipment, it is then also necessary to use impedance matching networks to match the transceiver-transmission line to the particular antenna system if the RF system performance is to be optimized. It is also desirable for an accessory unit to provide simple means for connecting various antennas or combination of antennas to a CB radio transceiver and to provide dummy load means to facilitate tune up and/or testing of the RF signal modulation. Prior art CB radio accessory units have not combined these various features into a single, simple-to-operate unit.

SUMMARY OF THE INVENTION

Accordingly, the present invention is an accessory unit for use with the CB radio transceiver and includes an SWR monitoring circiuit, an RF power detection circuit, and a field strength meter detection circuit, all of which may be selectively switched to provide appropriate measurement readings on a self-contained readout meter. The accessory unit also includes a variable impedance transformation network which may be selectively switched in or out of the CB transceiver-transmission line-antenna system circuit based upon the measurements obtained with the measuring circuits in the accessory unit. When in the circuit, the network may be easily adjusted, using the indications from the measuring circuits, to optimize the impedance transfer ratio. The accessory unit also has provision for connecting a citizen band antenna, a vehicle broadcast band (BC) antenna, and/or a random wire antenna in parallel for use with the CB transceiver. The accessory unit also has provision for connecting a vehicle BC receiver to the unit so that when the accessory unit is switched for BC operation the CB antenna system will be connected to provide a signal RF input to the vehicle BC receiver. When operating in the BC mode, the CB transceiver is disconnected from the antenna systems and instead connected to a non-radiating incandescent lamp dummy load which also serves as a modulation indicator when the CB transceiver is modulated in the transmitting mode. The accessory unit further includes a retractable whip field strength antenna which permits the field strength detection circuit to be used as a hand-held unit for measuring field strength at a point remote from a CB transmitting antenna. The unit also has provision for connection of an external field strength antenna. The unit further provides connections so that particular antenna(s) being used for field strength purposes are also connected to provide RF input signals to a vehicle BC receiver connected to the unit. The field strength meter detection circuit also provides an audio output by which the operator may monitor the audio quality of an amplitude modulated (AM) transmitted signal.

Accordingly, it is an object to provide a single, relatively inexpensive, simple-to-operate accessory unit for performing the following functions: (a) providing a meter indication of forward and reflected standing wave ratios on a CB radio transmission line; (b) providing a meter indication of the RF power output from a CB transceiver; (c) providing a meter indication of radiated RF power from a CB antenna system by making a field strength measurement; (d) providing a variable impedance matching network for matching CB transceiver-transmission line-antenna system to a CB transceiver impedance so that the efficiency of the overall RF system can be maximized; (e) providing a selector switch to selectively allow use of an antenna system for a CB transceiver and for a broadcast band receiver such as used in a vehicle; (f) providing switching means so that the operator may select the measurement to be made; (g) providing simple means for using an antenna system consisting of a vehicle BC antenna and/or a CB antenna and/or a random wire antenna operated in parallel with a CB transceiver; (h) providing a telescoping retractable whip field strength antenna operable independently of the CB antenna system connected to the accessory unit; (i) providing means for using the retractable field strength antenna as an antenna for the vehicle BC band receiver when the CB transceiver is operating in the transmitting mode; (j) providing a dummy load providing a visual indication of tune-up of the CB transceiver without radiating a transmitted signal; and (k) providing a visual indication of the modulation on a CB transmitter signal.

DETAILED DESCRIPTION OF THE PREFERRED EMBODIMENT

Figure 1:
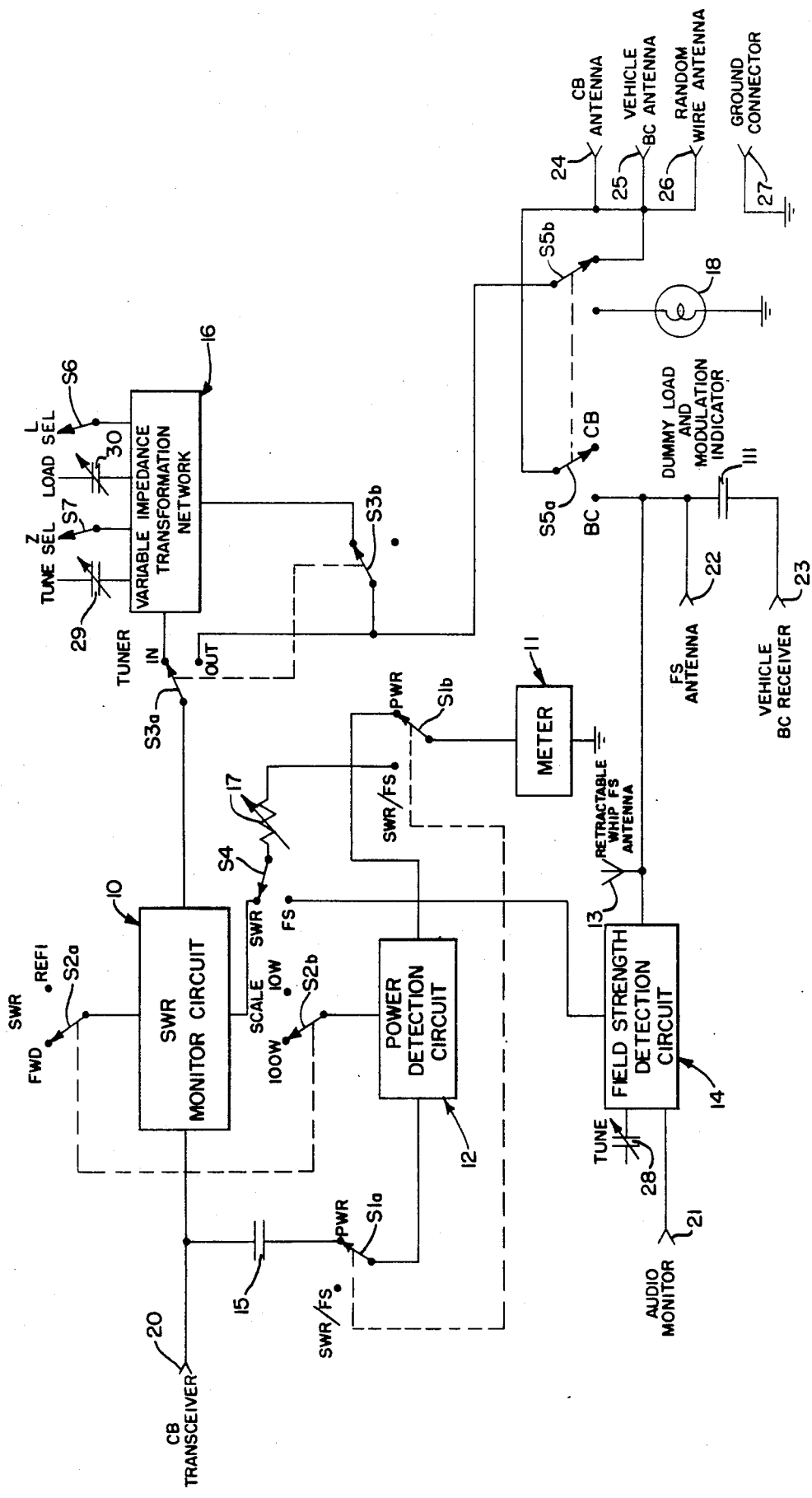
FIG. 1 is a partial schematic, partial block diagram of a CB accessory unit according to the present invention.

As shown in FIG. 1 a connector 20 of the accossory unit is adapted to be connected to a citizens band (CB) tranceiver (not shown) used with the accessory unit. The connector 20 is connected within the accessory unit to one terminal of a capacitor 15 and to an SWR Monitor Circuit 10. The other terminal of capacitor 15 is connected to one terminal of a switch S1a and provides an input signal to a Power Detection Circuit 12 from the CB transceiver when a switch S1 having two ganged switching sections (S1a and S1b) is set to the "Power" position. The output from the Power Detection Circuit 12 is connected to one terminal of a switch S1b so that when the switch S1 is in the "Power" position, the output from the Power Detection Circuit 12 is connected to a precalibrated meter 11 which is also connected to one terminal of the switch S1b.

The accessory unit also has a switch S2 having two ganged switching sections S2a and S2b. Switch S2 may be appropriately switched by the operator to control the indications on the meter 11 accordng to the measuring mode selected by the operator. One terminal of switch S2b is connected to the Power Detection Circuit 12 to select the appropriate full scale range setting for the meter 11 when switch S1 selects the "Power" mode for the meter 11.

Switch S2a is also connected to the SWR Monitor Circuit 10 and controls whether the meter 11 provides "Forward" or "Reflected" SWR readings when switch S1 is in the "SWR/Field Strength" mode and a switch S4 is switched to the "SWR" mode. The switch S4 connects the meter 11 through switch S1b and a variable resistance 17 to either the SWR Monitor Circuit 10 or a Field Strength Detection Circuit 14 as selected by the manual operator. When operating in the SWR monitoring mode, the variable resistance 17 is typically adjusted to provide a full scale reading on the meter 11 when switch S2 selects a "Forward" SWR reading and the CB transceiver is keyed to the transmit mode. Then, switch S2 is switched to select a "Reflected" SWR reading, thereby providing the correct SWR reading on the precalibrated meter 11.

When the measuring circuits are appropriately switched to select the field strength meter mode, the variable resistor 17 is adjusted to provide an appropriate relative indication on the meter 11 according to the detected strength of the CB signal by the Field Strength Detection Circuit 14. The Field Strength Detection Circuit 14 includes a variable capacitor 28 used to tune a resonant circuit (formed by capacitor 28 and an inductor 104) to maximize the output from the Field Strength Detection Circuit 14. The Field Strength Circuit 14 provides an output to an audio monitor connector 21 which is adapted to permit connection to a headset (not shown) used by a manual operator to monitor the audio quality of an amplitude modulated (AM) CB transmitter signal detected by Field Strength Detection Circuit 14. The accessory unit also includes a retractable whip field strength antenna 13 which is permanently (i.e. not switchably) connected to the RF input to the Field Strength Detection Circuit 14. The accessory unit also includes a connector 22 which is adapted to be connected to an external field strength antenna such as a random wire (not shown) to provide an RF input signal to Circuit 14. The accessory unit also includes a connector 23 which is adapted to be connected to a vehicle broadcast band (BC) receiver (not shown) installed in a vehicle in which the CB transceiver (not shown) is used. Connector 23 is connected to one terminal of a capacitor 111, the other terminal of which is connected to the RF input to Circuit 14. The RF input to Circuit 14 is also connected to one terminal of a switch S5a which is part of a switch S5 having two ganged switched sections S5a and S5b.

The citizens band transceiver (not shown) connected to the SWR Monitor Circuit 10 through connector 20 is also, in effect, connected directly to one terminal of a switch S3a. This effective direct connection is due to the arrangement of a coaxial cable (50 in FIG. 2) internally within the SWR Monitor Circuit 10 as will be further described. Switch s3a is part of a switch S3 having two ganged switched sections S3a and S3b. Switch S3 is used to switch the variable impedance transformation or matching network 16 "In" or "Out" of the circuit between the CB transceiver (not shown) and the antennas connected to the accessory unit. The network 16 includes a variable tuning capacitor 29, a variable loading capacitor 30, and two switches S7 and S8 adjustable or switchable by the operator to achieve desired impedance transformation ratios. As will be further described, switch S6 is a multi-position rotary switch referred to as the "L Selector" and is used to select any one of several taps on an inductor to set the effective inductance of an inductor (120 in FIG. 2) in the network 16. The switch S7 is a multiposition rotary switch referred to as the "Z Selector" and is used to select the circuit arrangement of the capacitors 29 and 30 and the inductor (120 in FIG. 2) in the network 16. When switch S3 is positioned so that the matching network 16 is "In", the CB transceiver (not shown) is connected through switch S3a to one terminal of the network 16. The other terminal of network 16 is then connected to one terminal switch S3b and through S3b to switch S5. When switch S3 is positioned to switch the network 16 "Out," the CB transceiver (not shown) is, in effect, connected directly to switch S5b.

Switch S5 is used to switch the accessory unit between the BC and CB modes. When the "CB" mode is selected by switch S5, the CB transceiver (not shown) is then connected through switch S5 (either effectively directly or through network 16) to connectors 24, 25, and 26, all of which are connected in parallel as well as to one terminal of switch S5a and to one terminal of switch S5b. Connector 24 is adapted to be connected to a conventional CB antenna (not shown). Connector 25 is adapted to be connected to a vehicle BC antenna (not shown) and connector 26 is adapted to be connected to a random wire or other antenna (not shown) provided by the user. An additional connector 27 on the accessory unit facilitates connecting a grounding wire for external grounding of the accessory unit. The connectors 24, 25, and 26 are all connected in parallel so that, in effect, the antenna system provided by the several antennas connected to those connectors operate in parallel.

On the other hand, when the "BC" mode is selected by switch S5, the CB transceiver (not shown) is effectively connected through switch S5 (either effectively directly or through network 16) to a dummy load and modulation indicator 18 which, typically, is an incandescent lamp. When switch S5 is thus selected, the incandescent lamp 18 may be used to provide a visual indication of the power output from the CB tranceiver's transmitter and the modulation on an AM or SSB signal from the CB transmitter. When the CB transmitter is modulated, the instantaneous brightness of lamp 18 will vary depending upon the degree of modulation.

As shown in FIG. 1, when the switch S5 is switched to the "BC" mode, the entire CB antenna system (not shown) comprised of the CB antenna, the vehicle BC antenna and/or the random wire antenna connected to connectors 24-26 are then all connected through switch S5 to the RF input to the Field Strength Detection Circuit 14.

Figure 2:
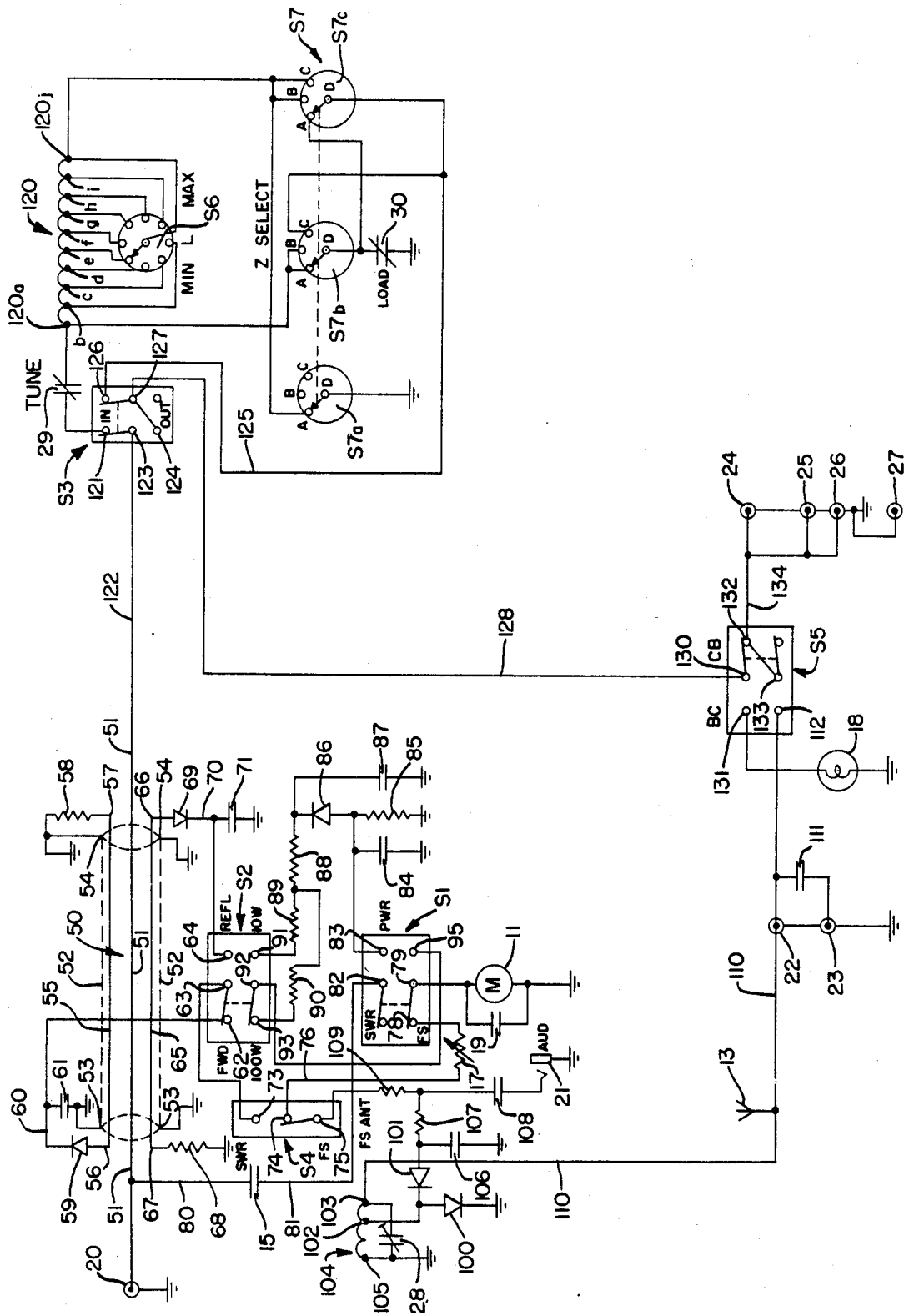
FIG. 2 is a schematic diagram of a CB accessory unit according to the present invention.

Referring now to FIG. 2, connector 20 is connected to a center conductor 51 of a coaxial cable 50 included in the SWR Monitoring Circuit 10. The external shielding braid 52 of the coaxial cable 50 is grounded at the respective ends 53 and 54 of the cable 50. A first insulated wire 55 having ends 56 and 57 is inserted longitudinally under the braid 52 of the coaxial cable 50. A second insulated wire 65 having ends 66 and 67 is similarly inserted longitudinally under the braid 52 of the coaxial cable 50. A resistor 58 is connected between ground and the end 57 of the insulated wire 55. The anode terminal of a diode 59 is connected to the end 56 of insulated wire 55 and the cathode terminal of the diode 59 is connected by a conductor 60 to a terminal 62 of switch S2a of switch S2. A capacitor 61 is connected between the cathode terminal of the diode 59 and ground. Similarly, a resistor 68 is connected between ground and the end 67 of the insulated wire 65. Similarly, the anode terminal of a diode 69 is connected to end 66 of the insulated wire 65 and the cathode terminal of the diode 69 is connected by a conductor 70 to a terminal 64 of switch S2a of switch S2. A capacitor 71 is connected between ground and the cathode terminal of the diode 69. An xample of a similar SWR monitor circuit is shown on p. 135 of the ARRL Antenna Handbook, 9th Edition, Copyright 1960 by the American Radio Relay League.

A terminal 63 of switch S2a of switch S2 is connected by a conductor 72 to terminal 73 of switch S4. Terminal 74 of switch S4 is connected by a conductor 76 to one terminal of the variable resistance 17. The other terminal of the variable resistance 17 is connected to a terminal 78 of switch S1b of switch S1 by a conductor 77. The meter 11 is connected between ground and a terminal 79 of switch S1b of switch S1. A capacitor 19 is connected in parallel with the meter 11.

Regarding the Power Detection Circuit 12, one terminal of the capacitor 15 is connected by a conductor 80 to the connector 20. The other terminal of the capacitor 15 is connected by a conductor 81 to a terminal 82 of switch S1a of switch S1. The anode terminal of a diode 86 is connected to a terminal 83 of switch S1a. A capacitor 84 and a resistor 85 are connected in parallel between the anode terminal of the diode 86 and ground. A capacitor 87 is connected between ground and the cathode terminal of the diode 86. The cathode terminal of the diode 86 is also connected to one terminal of a resistor 88, the other terminal of which is connected to one terminal of a resistance 90 and also to one terminal of a resistance 89. The other terminal of the resistance 89 is connected to a terminal 91 of swich S2b of switch S2. The other terminal of the resistance 90 is connected to a terminal 91 of switch S2b of switch S2. The values of the resistances 89 and 90 are appropriately selected to provide the desired full scale meter readings corresponding to the meter calibrations, depending upon the meter "Power" reading range selected by switch S2. A terminal 93 of switch S2b of switch S2 is connected by a conductor 94 to a terminal 95 of switch S1b of switch S1.

Regarding the Field Strength Meter Circuit 14, the RF input to Circuit 14 is provided by a conductor 110. The conductor 110 connects to an end terminal 103 of an inductor 104. The other end terminal 105 of the inductor 104 is connected to ground. The variable capacitor 28 is connected between ground and terminal 103 of the inductor 104 to form a resonant circuit adjustably tunable in the 27 Mhz CB frequency band. The inductor 104 has a tap terminal 102 to which is connected the anode terminal of a diode 100 and the cathode terminal of a diode 101. The cathode terminal of the diode 100 is connected to ground and the anode terminal of the diode 101 is connected to one terminal of a resistor 107 and also to one terminal of a capacitor 106. The other terminal of the capacitor 106 is connected to ground. The other terminal of the resistor 107 is connected to one terminal of a capacitor 108 and also to one terminal of a resistor 109. The other terminal of capacitor 108 is connected to the audio monitor connector 21. The other terminal of resistor 109 is connected to a terminal 75 of switch S4.

The conductor 110 is also connected to the retractable field strength whip antenna 13, to the field strength antenna connector 22, to terminal 112 of switch S5a of switch S5, and to one terminal of the capacitor 111. The other terminal of the capacitor 111 is connected to the BC receiver connector 23. The incandescent lamp 18 is connected between terminal 131 of switch S5b of switch S5 and ground.

The end of the center conductor 51 of the coaxial cable 50 not connected to connector 20 is connected to a conductor 122 which is connected to terminal 123 of switch S3a of switch S3. The variable tuning capacitor 29 is connected between a terminal 121 of switch S3a of switch S3 and an end terminal 102a of the inductor 120 in the variable impedance transformation network 16. The other end terminal of the inductor 120 is terminal 120j and is connected to terminal A of a switch S7a of switch S7 and to terminals B and C of switch S7c of switch S7. Switch S7 has three ganged switching sections S7a, S7b, and S7c, each of which has a center terminal D and three other terminals A, B, and C as shown in FIG. 2. The inductor 120 also has intermediate taps 120b-120i, all of which, together with end terminals 120a and 120j, are connected to the respective terminals of switch S6 as shown in FIG. 2. The operator may accordingly select the effective inductance in the matching network 16 by appropriate manipulation of switch S6. End terminal 120a is also connected to terminals A and B of switch S7b of switch S7. The center terminal D of switch S7a is connected to ground. The center terminal D of switch S7b is connected to terminal A of switch S7b and to one terminal of the variable loading capacitor 30. The other terminal of the variable loading capacitor 30 is connected to ground. The center terminal D of switch S7c is connected to terminal C of switch S7b and to terminal 126 of switch S3b by a conductor 125. Terminal 124 of switch S3b and terminal 127 of S3b are connected together as shown in FIG. 2. A conductor 128 is connected to terminal 127 of switch S3b and to terminal 130 of switch S5b of switch S5. Terminals 132 and 133 of switch S5 are connected together as shown in FIG. 2. A conductor 134 is connected to terminal 132 of switch S5b, to CB antenna connector 24, to BC antenna connector 25, and to random wire antenna connector 26.

To operate the accessory unit, the user connects a CB transceiver (not shown) to connector 20 and also connects a CB antenna (not shown) to connectors 24, 25, and/or 26 respectively. A vehicle BC receiver (not shown) may also be connected to connector 23. Connector 27 may be connected to an external ground such as a vehicle ground.

Then, to measure SWR, switch S1 is set to the "SWR/Field Strength" position, switch S2 is set to the "Forward" SWR position, and switch 54 is set to the "SWR" position. Next, the operator keys the CB transceiver to the transmit mode and resistance 17 is adjusted to provide a full scale meter deflection on meter 11. When the foregoing is first performed, switch S3 may be set so that the variable impedance transformation network 16 is "Out" of the transmission line circuit and so that S5 is set to the "CB" mode. In order to now obtain an SWR reading, switch S2 is switched to read "Reflected" SWR. The meter 11 will then provide the SWR measurement according to a precalibrated meter scale.

If the calibrated SWR reading is less than 1.5-1, the CB transceiver may be deemed well matched to the transmission line-antenna RF system. However, if the SWR reading is higher than 1.5 to 1, switch S3 should then be switched so that the variable impedance matching network 16 is "In" the tranmission line circuit. The variable tuning and loading capacitances 29 and 30 and the switches S6 and S7 should then be manipulated by the operator to minimize the SWR reading with switch S2 in the "Reflected" SWR position, while at the same time, maintaining a full-scale deflection with switch S2 in the forward position. The proper adjustment of the matching network 16 using the SWR monitor circuit 10 will require a number of interactive adjustments by the operator in a manner well known in the radio art.

In order to measure transmitted power output from the CB transceiver, switch S1 is set to the "Power" position and switch S2 is set to the appropriate meter range position for the power level to be measured. The meter 11 will then provide a measurement on a precalibrated scale of the transmitter output power when the transceiver is keyed to the transmit mode.

Field strength measurements may be made with the accessory unit either connected to the CB transceiver or operated as a separate hand-held unit with the telescoping retractable field strength antenna extended. To make field strength measurements, switch S1 is set to the "SWR/Field Strength" position and switch S4 is set to the "Field Strength" position. If the accessory unit is connected to a CB transceiver, switch S5 should be set to the "CB" position and the retractable whip field strength antenna 13 should be extended and/or an appropriate field strength antenna should be connected to connector 22. When the CB transmitter is then keyed to the transmit mode, variable resistance 17 may be adjusted to provide an appropriate relative field strength indication on meter 11. Variable capacitance 28 may be appropriately adjusted to turn the resonant circuit in the Field Strength Detection Circuit 14 to the frequency of the transmitted CB signal, thereby providing a peak indication on meter 11. The manual operator may also connect a headset to connector 21 to monitor the audio modulation on the transmitted CB signal being detected by the Field Strength Detection Circuit 14. When the accessory unit is used as a hand-held unit, the retractable whip field strength antenna 13 may be extended. The other controls should then be adjusted to provide an indication of relative field strength for the transmitted CB signal in the manner previously described.

While a presently-preferred embodiment of this invention has been described in detail and illustrated schematically in the accompanying drawings, it is to be understood that this invention is susceptible of other embodiments which differ in detail from the disclosed embodiments and that various refinements and omissions differing from the disclosed embodiments may be adopted without, however, departing from the spirit and scope of the present invention.

What is claimed is:
1. A CB radio accessory unit comprising:
an indicating meter means;
a first connector means for connecting to a CB radio;
an SWR monitor circuit connected to said first connector means to provide signals capable of being indicated on said meter means;
a power detection circuit switchably coupled to said first connector means to provide signals capable of being indicated on said meter means;
a field strength detection circuit having an RF input to provide signals capable of being indicated on said meter means;
a first switching means connected to said meter means for selectively connecting said SWR monitor circuit, said power detection circuit and said field strength detection circuit to said meter means to indicate said signals;
a second connector means for connecting to a vehicle broadcast band receiver and coupled to said RF input;
a third connector means for connecting to an antenna usable with a CB radio;
an impedance transformation network connected between said first connector means and said third connector means;
a second switching means connected to said SWR monitor circuit, said impedance transformation network and said third connector means for selectively connecting said impedance transformation network to said third connector means and said SWR monitor circuit or connecting said SWR monitor circuit to said third connector means; and
a third switching means connected to said third connector means and to said second switching means for connecting said third connector means to said RF input.

2. A CB radio accessory unit according to claim 1 further comprising a dummy load means connected to said third switching means and wherein said third switching means includes means for connecting said dummy load means to said second switching means.

3. A CB radio accessory unit according to claim 2 wherein said dummy load means comprises an incandescent lamp.

4. A CB radio accessory unit according to claim 1 further comprising a retractable antenna connected to said RF input, and wherein said field strength detection circuits includes an adjustable tuning means and provides an audio output.

5. A CB radio accessory unit according to claim 1 further comprising a variable resistance means switchably connectable to said SWR monitor circuit or to said field strength detection circuit for calibrating said meter means.

6. A CB radio accessory unit according to claim 1 further comprising a fourth connector means connected in parallel with said third connector means and adapted to be connected to a vehicle broadcast band antenna.

7. A CB radio accessory unit according to claim 1 wherein said impedance transformation network comprises an inductor having a plurality of taps, a fourth switching means connected to a plurality of said taps of said inductor; a first variable capacitor connected to said inductor; a fifth switching means connected to said inductor and to said first variable capacitor; and a second variable capacitor connected to said fifth switching means.

* * * * *